Patented May 14, 1929.

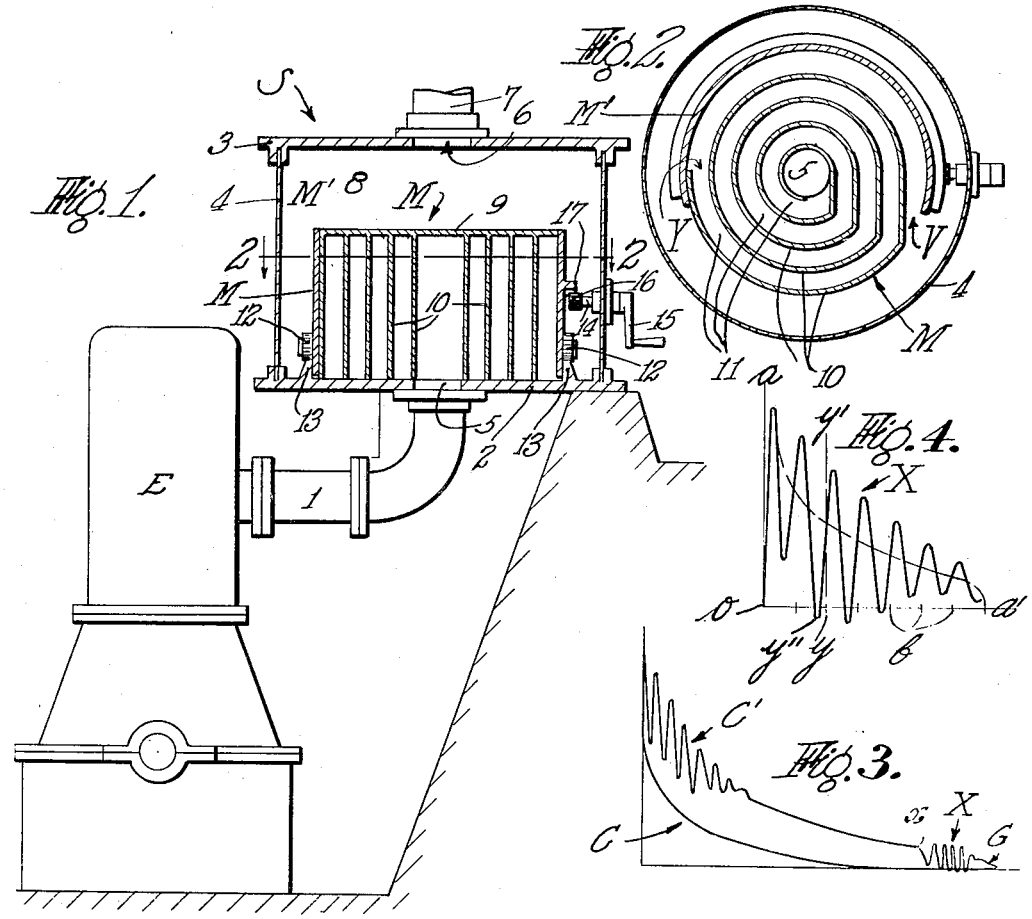

1,713,047

UNITED STATES PATENT OFFICE.

HIRAM HAMILTON MAXIM, OF HARTFORD, CONNECTICUT, ASSIGNOR, BY MESNE ASSIGNMENTS, TO THE MAXIM SILENCER COMPANY, OF HARTFORD, CONNECTICUT, A CORPORATION OF CONNECTICUT.

MEANS FOR ADJUSTING OSCILLATION PERIOD OF EXHAUSTS OF INTERNAL-COMBUSTION ENGINES.

Application filed November 14, 1924. Serial No. 750,013.

This invention relates to improvements in methods and apparatus for silencing the exhaust of an internal combustion engine with a minimum of back pressure.

The efficiency of a combustion engine depends to a large extent upon its ability to be relieved of its burned gases, that is to say, such an engine will develop more or less power according to the extent that it is scavenged of its dead gases. It is usual to use, in connection with such engines, some type of silencer or pipe coupled to the exhaust port which conducts the gases from the engine, but due to a misconception of the requirements of such silencers and a consequent improper designing thereof, the pipes or silencers heretofore employed are not suitable for conducting all of the gases from the engine and there results a considerable back pressure and an incomplete scavenging of the cylinder, which tends, most naturally, to impair the efficiency of the engine.

The present invention, relating to silencers, aims to take advantage of the fact that the exhaust gas pulse of an engine instead of consisting of a single sustained puff at a pressure greater than atmosphere, is, on the contrary, in the nature of a rapidly oscillating pressure alternating between relatively high and low pressures. This may be termed a pressure wave oscillating at high frequency between a comparatively high pressure above atmosphere and a relatively low pressure that may be below atmosphere.

In the carrying out of my invention, I arrange the timing of the frequency of the oscillations of pressure with respect to the closing of the exhaust port of the engine so that its closing coincides with a low pressure period of the pressure wave, since at that period there will be a minimum of back pressure in the cylinder and a resulting approximately complete scavenging thereof. The lower the pressure at which the port is closed, the more complete will be the scavenging of the cylinder and, as previously stated, it has been found to be desirable to time the closing of the port to coincide with some low pressure period to obviate, as far as possible, all back pressure.

However, due to the comparatively high frequency of the so-called pressure oscillations and to the mechanical impracticability of varying the timing of the exhaust port closing in relation to one of the lower pressure periods, I provide a novel method and apparatus for varying or controlling the wave length or frequency of the said pressure oscillations so that they may be timed to have a low pressure period that will coincide with the predetermined closing of the exhaust port. This may be accomplished by the provision of means for varying the physical proportions of the exhaust gas passageway, which passageway, according to my invention, may have its length or volume varied or controlled to thereby vary the physical proportions as above stated. I also find it practical to embody the principles of my invention in a muffler or silencer for the engine so that the double function may be performed of both silencing the noise of the exhaust and also effecting almost complete scavenging of the engine. A silencer of such a construction therefore will cause little or no back pressure and will contribute to a greater efficiency in the power output of the engine.

The principal object of my invention is the provision of a novel method and apparatus capable of producing the desired results and which is applicable to any and all types of combustion engines now in use.

Other objects and advantages will be apparent from the following description and accompanying drawings, in which is illustrated various forms of apparatus for practicing the invention, and it will be understood that various other embodiments may be employed to accomplish the desired results.

In the drawings:

Fig. 1 is a sectional elevational view through a frequency changing apparatus embodying the principles of my invention;

Fig. 2 is a sectional plan view taken on the line 2—2 of Fig. 1;

Figs. 3 and 4 are diagrammatic representations of an indicator chart which graphically represents the relative pressures within a combustion engine cylinder during a complete cycle or stroke of the piston.

The apparatus now to be described is only intended to enable those skilled in the art to practice the invention and various other types of apparatus may be employed if desired.

Fig. 1 of the drawings shows an engine E, that may be of the multicylinder type, which has its exhaust pipe 1 connected to a silencer S that is supported, as shown, and held in a rigid relation with respect to the engine. The silencer S may comprise lower and upper headers 2 and 3 that are secured to a shell 4, thus providing a cylindrical shell-like structure forming a chamber 8 in communication with the exhaust pipe 1 by means of the port 5. An outlet pipe 7 overlies an outlet port 6 in the upper header 3, whereby the interior of the chamber 8 is in communication with atmosphere at all times.

A scroll member M, having an upper end wall 9, is provided with a depending vertical wall 10 arranged in the shape of a spiral, as best shown in Fig. 2. The inner turn of the spiral wall circumscribes the inlet port 5 at the bottom header 2, while the wall 9 of the casing and bottom header 2 of the silencer close the spaces between the turns of the spiral so that a passageway 11 is provided that extends spirally from the center port 5 to the outer periphery of the casing. The scroll member is preferably secured in the position shown and normally conducts the exhaust gases spirally and outwardly from the port 5 to the interior chamber 8 of the shell. A half cylindrical or semi-circular member M' is provided that is adapted to partially encircle the member M, as best shown in Fig. 2. The said member M' is arranged for a free rotative movement about the casing M and is supported by rollers 12 that ride upon a circular track 13 extending upwardly from the bottom header 2.

A shaft 14, carried for a rotative movement in a side of the shell 4, has fixed to its outer end a crank handle 15, while its inner end has fixed thereto a pinion gear 16 that engages with a circular rack 17 carried by the member M'. This mechanism is adapted and arranged so that a rotation of the crank handle will rotate the member M' with respect to the casing M and thereby vary the length of the passageway 11 and consequently vary or control the total length of the exhaust conduit for the exhaust gases.

As shown in Fig. 2, the spiral passageway 11 opens into the chamber 8 at V and the arrangement provides for varying the position of this opening through almost 180° to approximately the point Y. This variation of the spiral discharge opening with consequent variation of the length of the spiral passageway 11 makes possible a sufficient range of adjustment to take care of the natural period of oscillatory pressure discharge from the ordinary engine and to so vary its wave length that a time of low pressure will coincide with the closing of the engine exhaust port.

In describing the operation of the apparatus, reference will first be made to the indicator diagram represented in Fig. 3, which shows the relative pressures within a combustion cylinder during one complete cycle of operation. The compression stroke, as will be seen, is represented on the lower side of the diagram at C, the combustion period at C' and the exhaust period at X, the point x indicating the opening of the exhaust valve, while G represents the intake or charging period of the stroke or cycle. It will be observed that during the combustion stroke C' and the exhaust stroke X, the pressure alternates in the form of oscillations between relatively low and high pressure periods as previously explained, and since we are not concerned with the variations during the combustion stroke, that part X of the curve, showing the varions in pressure during the exhaust period, is represented at a larger scale in Fig. 4. In this diagram, the vertical axis o—a is a measure of pressure and the horizontal axis o—a' a measure of time divided into units b. It is assumed that the closing of the exhaust port of the engine occurs at the point y. The pressure wave of the exhaust, illustrated in this view, may be assumed to have the natural period caused by usual exhaust pipe and muffler connections and before any adjustment thereof is made. It will be observed that the closing of the exhaust port under such conditions does not coincide with a low pressure point in said wave as indicated by the dotted line y—y'. Only fair scavenging of the engine would result from such conditions. A much worse condition might occur if the line y—y' intersected the crest of a wave, and obviously the best conditions for scavenging would result from so increasing the wave length (distance from crest to crest) of said oscillatory discharge that the trough y'' of a wave would be intersected by the line y—y'. This would mean that the exhaust would close at a period of low pressure, perhaps even below atmospheric pressure, when the engine would be most completely scavenged of its dead gases.

While I have shown apparatus of a certain structure for varying the length and volume of the exhaust passageway, it will be obvious that any other apparatus desired may be employed that will function in a like manner, and I therefore prefer not to be limited by the foregoing description, but rather by the appended claims.

What I claim is:

1. The combination with an internal combustion engine of a silencer for the exhaust of said engine comprising, a scroll member providing a spiral passageway of several convolutions formed of concentric wall portions, a movably mounted concentric wall portion overlapping the outermost wall of said scroll member, and means to adjust said movable wall portion about the axis of said scroll member to vary the length of said spiral passageway.

2. The combination with an internal combustion engine of means for reducing the back pressure of the exhaust comprising a spirally arranged exhaust passageway of adjustable dimensions and means for effecting gradual variation in said dimensions so as to vary the frequency of the exhaust pressure wave.

3. The combination with an internal combustion engine of a silencer for the exhaust of said engine comprising a scroll member providing a spiral passageway and having an adjustable portion for varying the length of said spiral passageway, and means for adjusting the same whereby the oscillation frequency of said exhaust pressure wave may be controlled.

4. The combination with an internal combustion engine of means for reducing the back pressure of the exhaust comprising a spirally arranged exhaust passageway of adjustable dimensions and means for effecting a gradual variation in said dimensions so as to vary the frequency of the exhaust pressure wave whereby the closing of the exhaust valve of said engine takes place simultaneously with the arrival of a low pressure region in said exhaust pressure wave at said exhaust valve.

5. The combination with an internal combustion engine, of a silencer for the exhaust of said engine comprising a scroll member providing a spiral passageway and having an adjustable portion for varying the length of said spiral passageway, and means for adjusting the same whereby the oscillation frequency of said exhaust pressure wave may be adjusted so as to make simultaneous the closing of the exhaust valve of said engine and the arrival, at said exhaust valve, of a low pressure region in said exhaust pressure wave.

In testimony whereof I have affixed my signature.

HIRAM HAMILTON MAXIM.